United States Patent
Allen

(10) Patent No.: US 6,944,880 B1
(45) Date of Patent: Sep. 13, 2005

(54) METHODS FOR AUDIO CAPTURE AND COMMUNICATION DURING TELEVISION BROADCASTS

(75) Inventor: Paul G. Allen, Mercer Island, WA (US)

(73) Assignee: Digeo, Inc., Kirkland, WA (US)

( * ) Notice: Subject to any disclaimer, the term of this patent is extended or adjusted under 35 U.S.C. 154(b) by 990 days.

(21) Appl. No.: 09/707,073

(22) Filed: Nov. 6, 2000

Related U.S. Application Data

(60) Provisional application No. 60/238,487, filed on Oct. 6, 2000, provisional application No. 60/237,013, filed on Sep. 29, 2000.

(51) Int. Cl.$^7$ ............................................. H04N 7/173
(52) U.S. Cl. ............ 725/106; 379/102.01; 379/102.03; 348/14.01; 348/14.04; 348/734
(58) Field of Search ................. 725/131–134, 725/109, 111–113, 139, 140–142, 151–153; 348/734, 14.05, 14.01, 14.04; 379/102.01, 379/102.02, 102.03, 100.16, 100.17

(56) References Cited

U.S. PATENT DOCUMENTS

| | | | |
|---|---|---|---|
| 5,138,649 A | 8/1992 | Krisbergh et al. ............ 379/56 |
| 5,247,580 A | 9/1993 | Kimura ........................ 381/43 |
| 5,283,819 A | 2/1994 | Glick et al. ................... 379/90 |
| 5,325,202 A | 6/1994 | Washino ..................... 348/222 |
| 5,410,326 A | 4/1995 | Goldstein ................... 348/134 |
| 5,490,208 A | 2/1996 | Remillard ..................... 379/96 |
| 5,548,323 A * | 8/1996 | Callahan ...................... 725/33 |
| 5,570,415 A | 10/1996 | Stretton et al. ............. 379/110 |
| 5,585,850 A | 12/1996 | Schwaller ................... 348/388 |
| 5,585,865 A | 12/1996 | Amano et al. .............. 348/731 |
| 5,587,735 A | 12/1996 | Ishida et al. ................... 348/14 |
| 5,600,368 A | 2/1997 | Matthews, III ............. 348/143 |
| 5,606,365 A | 2/1997 | Maurinus et al. ........... 348/222 |
| 5,666,159 A | 9/1997 | Parulski et al. ............. 348/211 |
| 5,671,267 A | 9/1997 | August et al. ................. 379/61 |
| 5,675,390 A | 10/1997 | Schindler et al. ........... 248/552 |
| 5,748,238 A | 5/1998 | Wakabayashi et al. ...... 348/373 |
| 5,760,824 A | 6/1998 | Hicks, III ..................... 348/14 |
| 5,761,604 A | 6/1998 | Stough ........................ 455/3.2 |
| 5,774,859 A | 6/1998 | Houser et al. .............. 704/275 |
| 5,793,416 A | 8/1998 | Rostoker et al. .............. 348/17 |
| 5,796,424 A | 8/1998 | Ely et al. ........................ 348/15 |
| 5,907,322 A | 5/1999 | Kelly et al. ................. 345/327 |
| 5,910,815 A | 6/1999 | Boursier et al. .............. 348/14 |
| 5,936,679 A | 8/1999 | Kasahara et al. ........... 348/553 |
| 5,949,474 A | 9/1999 | Gerszberg et al. ............ 348/14 |
| 5,963,245 A | 10/1999 | McDonald .................... 348/14 |
| 5,990,927 A | 11/1999 | Hendricks et al. ............. 348/6 |
| 5,995,155 A | 11/1999 | Schindler et al. ........... 348/461 |
| 5,999,207 A | 12/1999 | Rodriguez et al. ............ 348/14 |
| 6,009,336 A | 12/1999 | Harris et al. ................. 455/566 |

(Continued)

FOREIGN PATENT DOCUMENTS

| | | | | |
|---|---|---|---|---|
| JP | 406351016 A | 12/1994 | ............ H04N 7/15 |

(Continued)

*Primary Examiner*—Ngoc K. Vu
(74) *Attorney, Agent, or Firm*—Kory D. Christensen; Stoel Rives LLP

(57) ABSTRACT

A remote control for an interactive television system includes an integrated microphone and a wireless transmitter for transmitting audio information generated by the microphone to the interactive television system. A set top box for the interactive television system includes a wireless receiver for receiving the audio information and a converter for transforming the audio information into a network-compatible audio stream for transmission to a network.

24 Claims, 8 Drawing Sheets

U.S. PATENT DOCUMENTS

| | | | |
|---|---|---|---|
| 6,069,567 A | 5/2000 | Zawilski | 340/825.22 |
| 6,072,521 A | 6/2000 | Harrison et al. | 348/12 |
| 6,073,192 A | 6/2000 | Clapp et al. | 710/65 |
| 6,075,575 A | 6/2000 | Schein et al. | 348/734 |
| 6,084,638 A | 6/2000 | Hare et al. | 348/552 |
| 6,128,033 A | 10/2000 | Friedel et al. | 348/15 |
| 6,130,726 A | 10/2000 | Darbee et al. | 348/734 |
| 6,137,525 A | 10/2000 | Lee et al. | 348/14 |
| 6,177,950 B1 | 1/2001 | Robb | 348/14 |
| 6,188,985 B1 | 2/2001 | Thrift | 704/275 |
| 6,202,211 B1 | 3/2001 | Williams, Jr. | 725/78 |
| 6,204,796 B1 | 3/2001 | Chan et al. | 341/176 |
| 6,205,318 B1 | 3/2001 | Schindler et al. | 455/6.3 |
| 6,219,109 B1 | 4/2001 | Raynesford et al. | 348/734 |
| 6,227,974 B1 | 5/2001 | Eilat et al. | 463/40 |
| 6,243,129 B1 | 6/2001 | Deierling | 348/15 |
| 6,246,441 B1 | 6/2001 | Terakado et al. | 348/552 |
| 6,256,019 B1 | 7/2001 | Allport | 345/169 |
| 6,256,060 B1 | 7/2001 | Wakui | 348/211 |
| 6,281,925 B1 | 8/2001 | Kosaka | 348/14.02 |
| 6,292,210 B1 * | 9/2001 | Gerszberg et al. | 348/14.01 |
| 6,397,388 B1 * | 5/2002 | Allen | 725/133 |
| 6,760,415 B2 * | 7/2004 | Beecroft | 379/110.01 |
| 6,772,436 B1 * | 8/2004 | Doganata et al. | 725/106 |
| 2002/0104090 A1 * | 8/2002 | Stettner | 725/60 |

FOREIGN PATENT DOCUMENTS

| | | | | |
|---|---|---|---|---|
| JP | 410336492 A | 12/1998 | | H04N 5/225 |
| JP | 411069463 A | 3/1999 | | H04Q 9/00 |
| JP | 11-215420 | 8/1999 | | |
| JP | 411234639 A | 8/1999 | | H04N 7/14 |
| JP | 411355706 A | 12/1999 | | H04N 5/765 |
| JP | 02000151871 A | 5/2000 | | H04N 1/00 |
| JP | 02000156869 A | 6/2000 | | H04N 9/04 |

* cited by examiner

METHODS FOR AUDIO CAPTURE AND COMMUNICATION DURING TELEVISION BROADCASTS

RELATED APPLICATIONS

The present application is related to and claims priority from U.S. Provisional Application No. 60/237,013, entitled "Systems, Methods, and Devices for Video and Audio Capture and Communications," filed Sep. 29, 2000, with inventor Paul. G. Allen, which is hereby incorporated by reference in its entirety. The present invention is also related to and claims priority from U.S. Provisional Application No. 60/238,487, entitled "Systems, Methods, and Devices for Audioconferencing During Television Broadcasts," filed Oct. 6, 2000, with inventor Paul. G. Allen, which is hereby incorporated by reference in its entirety.

BACKGROUND OF THE INVENTION

1. Field of the Invention

The present invention relates generally to interactive television systems, and more particularly, to methods for audio capture and communication during television broadcasts.

2. Description of the Background Art

Television watching is an immensely popular pastime throughout the world. Indeed, one or more televisions may be found in virtually every residence in the United States and in many foreign countries.

For many, the television viewing experience is enhanced by watching television programs with other people. Thus, typical residences are equipped with numerous seats in front of a television to accommodate several family members and friends. Certain television programs are more frequently viewed in the company of others. For example, sporting events, television premieres, political debates, and other significant television broadcasts are typically viewed by groups of people.

Often it is inconvenient for viewers to be physically present in the same room due to geographical distances, conflicting schedules, short notice, and other limitations. In such instances, viewers may watch a television program individually and then meet at a later time to discuss the program. However, if the viewers are unable to meet for an extended period of time, a discussion of the program may become stale.

Alternatively, viewers may teleconference during a program (e.g., call one another on a telephone) for a more interactive discourse. Unfortunately, conventional teleconferencing presents a number of disadvantages.

For example, extended teleconferencing during a broadcast may deprive other household members of the use of the telephone. Moreover, a telephone may not be easily accessible at the viewer's location, and relocating a telephone to the viewer's location may be difficult or inconvenient, particularly after a program has commenced. In addition, teleconferencing may be expensive, particularly where more than two parties are connected simultaneously.

Thus, it would be an advancement in the art to provide a convenient technique for conversing during a television broadcast with one or more other viewers at remote physical locations. It would be a further advancement in the art to provide a cost-effective system for conferencing which provides minimal disruption of the television program being viewed.

SUMMARY OF THE INVENTION

The present invention provides systems, methods, and devices that overcome the above-described problems and disadvantages. In one embodiment of the invention, a remote control for an interactive television system includes an integrated microphone and a wireless transmitter for transmitting audio information from the microphone to the interactive television system. The remote control transmits audio information via a wireless transmitter to a wireless receiver within the interactive television system. In one embodiment, the remote control includes a specifically-designated button for activating the microphone, as well as an activity indicator for visually indicating when the microphone is active.

In another aspect of the invention, a set top box for an interactive television system includes the wireless receiver for receiving the audio information sent by the remote control. The set top box further includes a converter for transforming the audio information into an audio stream compatible for transmission over a network. In an alternative embodiment, the set top box, itself, includes an integrated microphone in lieu of, or in addition to, the microphone integrated with the remote control.

In yet another aspect of the invention, the microphone captures an audio signal in response to being activated by a specifically-designated button on the remote control. The captured audio signal is then transmitted using the transmitter in the remote control to a receiver in the set top box.

Within the set top box, the captured audio signal is converted into an audio stream compatible for transmission over a network. Thereafter, the audio stream is transmitted upstream from the set top box to the network. The audio stream is then sent downstream from the network to a second set top box, where the stream is converted into an audio signal for playback on a television coupled to a second set top box.

In return, the first set top box may receive an audio stream from the second set top box and convert the audio stream into an audio signal for playback. During the exchange and playback of the audio signals, viewers may watch television programs and converse with one another.

These and other features and advantages of the present invention will become fully apparent by examination of the following description of the preferred embodiments and the accompanying drawings.

BRIEF DESCRIPTION OF THE DRAWINGS

Non-limiting and non-exhaustive embodiments of the present invention are described in the Figures, in which.

DETAILED DESCRIPTION OF THE PREFERRED EMBODIMENTS

Embodiments of methods for audio capture and communication are described herein. In the following description, numerous specific details are provided, such as examples of programming, user selections, transactions, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Figure 1:
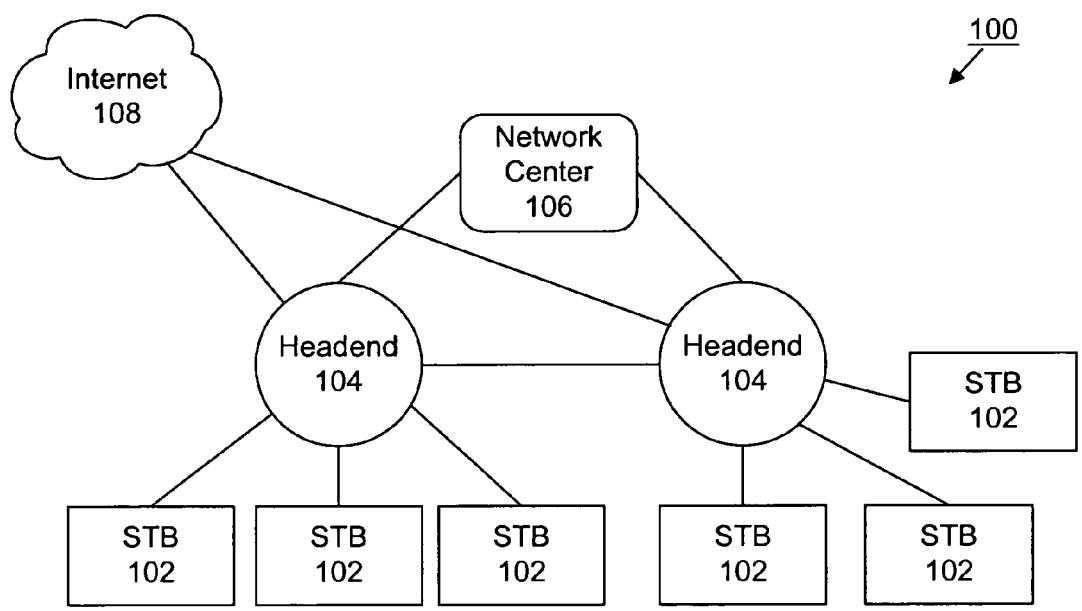
FIG. 1 is a diagram of a television network according to an embodiment of the invention.

Referring now to FIG. 1, there is shown a television network 100, such as a cable network, according to an embodiment of the invention. In one implementation, the network 100 includes a plurality of set top boxes 102 (hereinafter STB 102) or other customer premises equipment (CPE) located, for instance, at customer homes. Generally, an STB 102 is consumer electronics device that serves as a gateway between a customer's television and a broadband communication network, such as a cable network. As its name implies, an STB 102 is typically located on top of, or in close proximity to, a customer's television.

In one embodiment, an STB 102 receives encoded television signals and other data from the network 100 and decodes the same for display on the television. Additionally, an STB 102 receives commands from a user (typically via a remote control) and transmits such commands back to the network 100.

In various embodiments, each STB 102 is connected to a headend 104. In the context of cable network, a headend 104 is a centrally-located facility where cable TV (CATV) channels are received from a local CATV satellite downlink and packaged together for transmission to customer homes. In one embodiment, the headend 104 also functions as a Central Office (CO) in the telephone industry, routing audio streams and other data to and from the various STBs 102 serviced thereby.

Headends 104 may be coupled directly to one another or through a network center 106. In some cases, headends 104 may be connected via a separate network, one particular example of which is Internet 108. Of course, the illustrated network topology is provided for example purposes only, and other network topologies may be used within the scope of the invention.

As described in greater detail below, an STB 102 may transmit audio streams to one or more other STBs 102 connected to the network 100. The communication path for the transmission may involve one or more headends 104, network centers 106, and/or the Internet 108.

For example, a first STB 102 may send an audio transmission upstream to a first headend 104, then to a second headend 104, and finally downstream to a second STB 102. The transmission may use various standard protocols, such as MPEG or audio over IP (Internet Protocol).

The first and second headends 104 may be one and the same if the STBs 102 are served by the same headend 104. The transmission between headends 104 may occur (i) via a direct peer-to-peer connection between headends 104, (ii) upstream from the first headend 104 to a network center 106 and then downstream to the second headend 104, or (iii) via the Internet 108.

As described in detail hereafter, each STB 102 may be identified by a unique number, code or address, such as an IP (Internet Protocol) address. Thus, a user of one STB 102 may indicate an STB 102 to receive an audio transmission by specifying the corresponding address. The network 100 then routes the transmission to its destination using conventional techniques.

Figure 2:
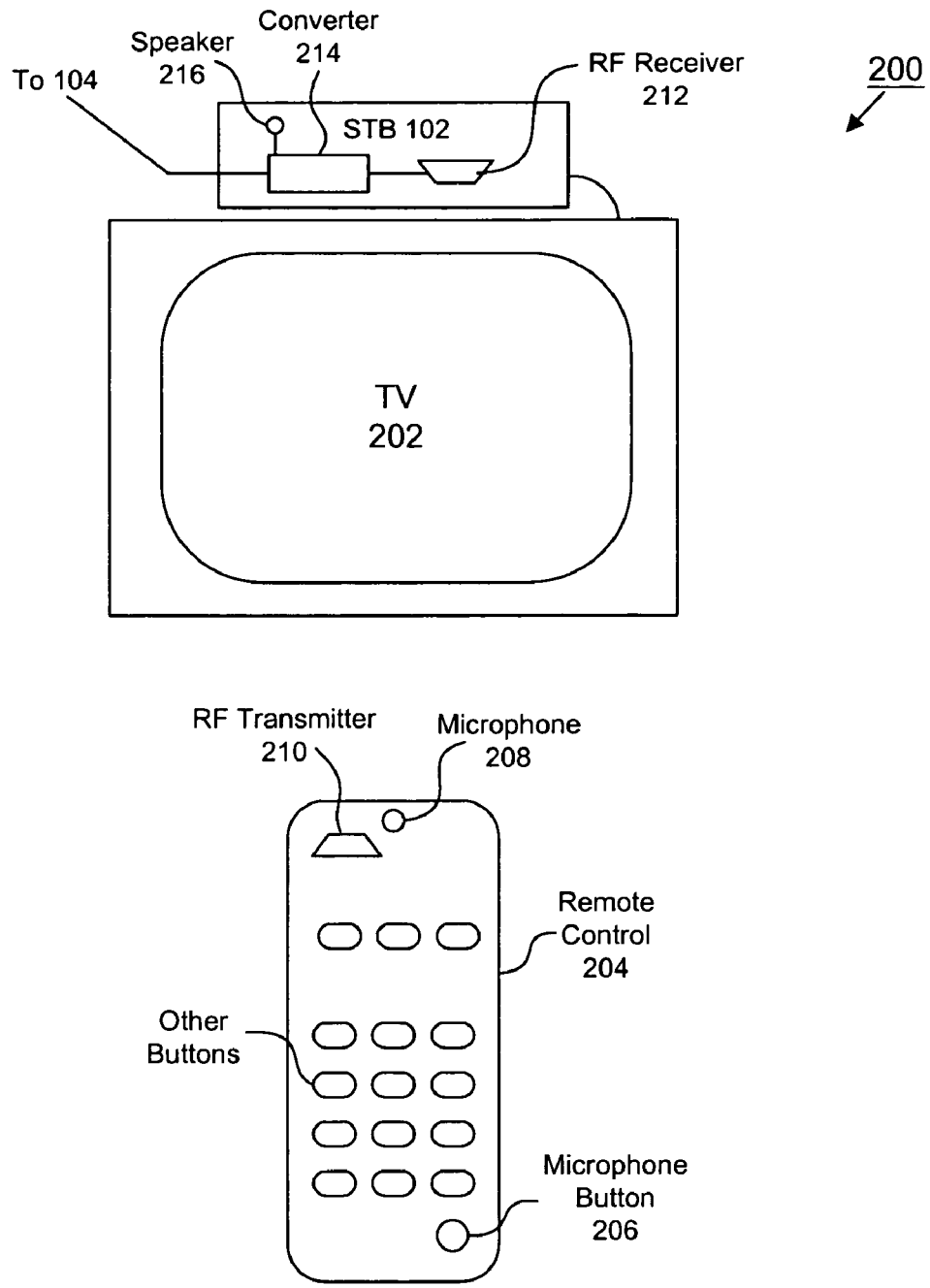
FIG. 2 is a schematic block diagram of an interactive television system according to an embodiment of the invention.

Referring now to FIG. 2, there is shown an interactive television system 200 according to an embodiment of the invention. The television system 200 preferably includes a television 202, which is configured to receive and display standard analog or digital television signals or high-definition television (HDTV) signals. In one embodiment, the television system 200 also includes a STB 102, as discussed above, for receiving television signals and sending and receiving audio information to and from the network 100.

In one embodiment, a remote control 204 is provided for convenient remote operation of the STB 102 and the television 202. As described below, the remote control 204 may communicate with the STB 102 and television 202 using conventional techniques to adjust, for example, the volume of the television, the displayed channel, and the like.

In the illustrated embodiment, the remote control 204 includes a microphone 208 for capturing sound waves and generating an analog or digital audio signal. The microphone 208 is in electrical communication with a microphone button 206, which toggles operation of the microphone 208 in one implementation. The remote control 204 may further include additional buttons to control various features of the STB 102 and the television 202. As used herein, the term "button" contemplates other types of controls, such as switches and the like. In addition, multiple buttons or controls may be provided for activating and deactivating the microphone 208.

In the illustrated embodiment, the remote control 204 further includes a radio frequency (RF) transmitter 210. In alternative embodiments, the transmitter 210 may be configured to use infrared (IR), microwave, VHF, UHF, or other frequencies along the electromagnetic spectrum.

In one implementation, the transmitter 210 is in electrical communication with the microphone 208 to receive captured audio information. The transmitter 210 preferably modulates the audio information with a carrier frequency to enable transmission thereof to the STB 102 using techniques well known in the art. For example, the transmitter 210 may operate according to the IEEE 802.11a or 802.11b Wireless Networking standards, the "Bluetooth" standard, or according to other standard or proprietary wireless techniques. Modulation techniques may include spread spectrum, frequency shift keying, multiple carrier, or other techniques known in the art.

To achieve modulation and transmission, the transmitter 210 may include various additional components not specifically illustrated but well known in the art. For example, the transmitter 210 may include a source encoder to reduce the amount of bandwidth required, a channel encoder to modulate the audio information with a carrier wave, and a directional or non-directional transmission antenna. The transmitter 210 may further include an amplifier to increase the transmission signal strength to an appropriate power level.

Preferably, the transmitter 210 is a high-bandwidth transmitter capable of sending the audio information to the STB 102 in real time. In one embodiment, the transmitter 210 may use wideband frequency modulation over a frequency band to provide a one-way audio link from the remote control 204 to the STB 102. For example, frequency band may be within the 890–960 MHz range (GSM), 1990–2110 MHz range or 2400–2500 MHz range or other frequency ranges as approved by FCC regulations. The one-way audio link between remote control 204 and STB 102 also provides for efficiency in manufacture, as a two-way audio link is not required in accordance with this embodiment. In another embodiment, the transmitter 210 utilizes a frequency division multiplexing (FDM) technique in order to transmit several streams of data simultaneously. These streams may be reassembled at the STB 102 to derive the encoded audio information. Various other techniques for providing a high bandwidth in multimedia transmissions may also be used within the scope of the invention.

In one embodiment, the transmitter 210 is configured to broadcast digital signals. As such, the transmitter 210 may include an analog-to-digital converter (ADC) to convert analog audio signals from the microphone 209 into digital information. The present invention contemplates both the use of analog and digital transmissions from the remote control 204.

In accordance with one embodiment, the transmitter 210 comprises an an integrated RF antenna (linear or otherwise configured) etched onto the main printed circuit board of the remote 204. Integration of the antenna with the remote control's circuit board provides for compactness and efficiency in manufacture.

In various embodiments, the remote control 204 is also in electrical communication with a processor (not shown) that senses a user's operation of the buttons of the remote control 204 and generates appropriate command signals for transmission to the STB 102 and television 202 in order to control the operation of the same.

In the illustrated embodiment, the STB 102 includes an RF receiver 212 for receiving information from the transmitter 210 in the remote control 204. Such a receiver 212 may include an antenna integrated into a printed circuit board (either a main board or a card coupled to a main board) within the STB 102. The receiver 202 may also demodulate audio information from the modulated band transmitted by the remote control 204. In various embodiments, the receiver 212 may be configured to receive IR, microwave, VHF, UHF, or other frequencies. In one embodiment, the receiver 212 demodulates the audio information contained within a carrier frequency of the transmission.

The receiver 212 may further include components not specifically illustrated but well known in the art. For example, the receiver 212 may include an antenna for receiving the transmission, an amplifier for increasing the strength of the received signal, and a decoder for separating and demodulating the audio information from the carrier signal.

In one implementation, the receiver 212 is in electrical communication with a converter 214, which converts the audio information into a digital audio stream compatible for transmission over the network 100. The conversion process may include compressing the information to improve transmission speed.

As noted above, the converter 214 is in electrical communication with a headend 104 in order to transmit the network-compatible audio stream to one or more other STBs 102 in the network 100. The converter 214 is further configured to receive network-compatible audio streams from the network 100 and transform the same into audio signals for playback on the television 202 or a speaker 216 integrated with the STB 102. In particular, the transmission from the STB 102 to the network 100 must be made to be compatible with upstream transmission in the network 100. For example, in a cable distribution network 100, one or more frequency bands (for example from 5 to 30 MHz) may be reserved for upstream transmission. Digital modulation (for example, quadrature amplitude modulation or vestigial sideband modulation) may be used to send digital signals in the upstream transmission. Various protocols, such as MPEG or audio over IP, may be used to embed the audio stream in the digital signals. Upstream transmission will be accomplished differently for different networks 100. Alternative ways to accomplish upstream transmission include an analog telephone line, ISDN, DSL, and other techniques.

Figure 3:
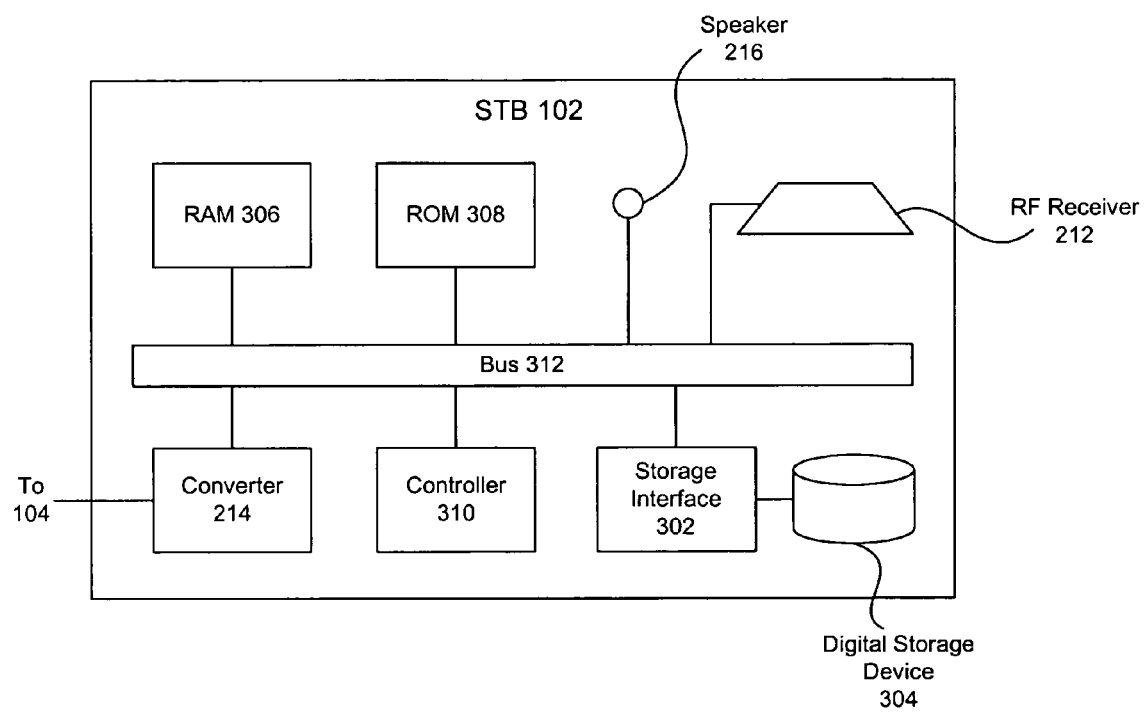
FIG. 3 is a schematic block diagram of a set top box according to an embodiment of the invention.

Referring to FIG. 3, there is shown an expanded block diagram of an STB 102 according to an embodiment of the invention. The STB 102 may include a storage interface 302, which provides access to a digital storage device 304, such as a hard disk drive or the like. In one embodiment, the storage interface 302 receives audio information from the receiver 212 and delivers the same to the digital storage device 304 for storage. The audio information may be stored in MPEG (MP3) format or other encoded file formats. Alternatively, the audio information may be converted by the converter 214 into a network-compatible audio stream before being stored in the storage device 304.

In one embodiment, the converter 214 includes conventional interface circuitry for communicating with the network 100. In an alternative embodiment, a separate network interface (not shown) may be provided, such as a cable modem or the like. Such a cable modem may operate in accordance with the DOCSIS or DAVIC standards.

The STB 102 may further include a random access memory (RAM) 306 configured to store data for temporary use. Similarly, a read-only memory (ROM) 308 may be provided for storing more permanent data, such as fixed code and configuration information. In one embodiment, the ROM 308 may be used to store an operating system for the STB 102, such as Windows CE® or Linux®.

The STB 102 preferably includes a controller 310 that is in communication with the receiver 212, the converter 214, the storage interface 302, the RAM 306, the ROM 308, the converter 214, and the speaker 216. The controller 310 may be coupled to the other components of the STB 102 via a bus 312.

In various embodiments, the controller 310 may be embodied as a microcontroller, a microprocessor, a digital signal processor (DSP) or other device known in the art. The controller 310 manages the operation of the STB 102, including, for example, the conversion of the encoded audio information, the storage of the audio information, the transmission and reception of audio information from the network 100, and the like. As noted above, the controller 310 may perform these and other operations based on control signals generated by the remote control 204 and transmitted to the receiver 212.

As described in greater detail below, the audio information may be converted, compressed and transmitted across the network 100 to one or more other STBs 102 where it is played back on corresponding televisions 202 or speakers 216. In one embodiment, a user may select which STB(s) 102 will receive an audio transmission by entering one or more addresses of the receiving STB(s) 102 using the remote control 204. As noted above, the address of an STB 102 uniquely identifies the STB 102 within the network 100 and is used by the headends 104, network centers 106, and/or the Internet 108 to route a network-compatible audio stream to the appropriate STB 102 using conventional techniques.

In various embodiments, an STB 102 may simultaneously send and receive multiple audio streams. In this manner, audio conferencing of networked interactive television systems 200 is enabled.

Figure 4:
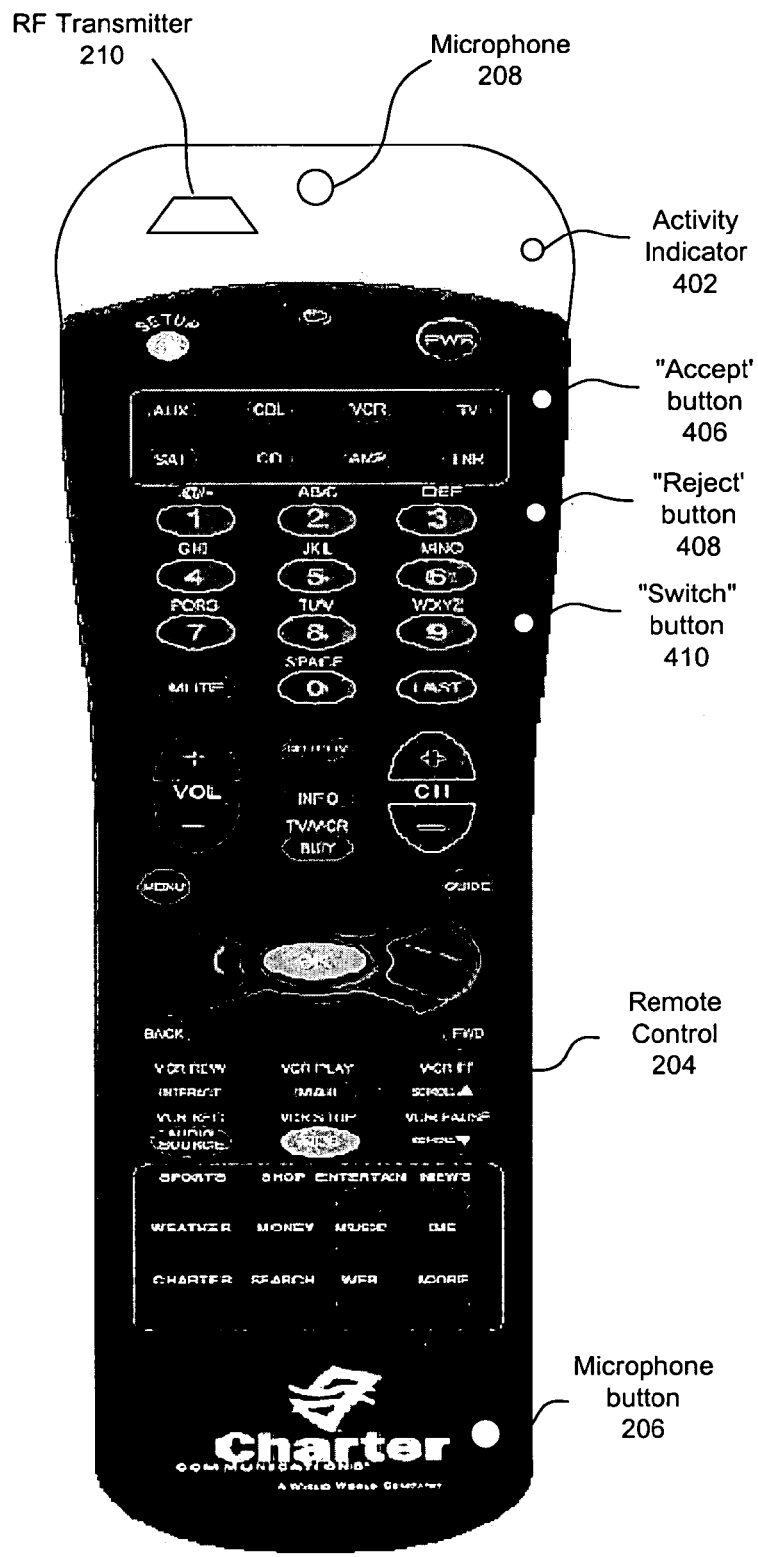
FIG. 4 is a plan view of a remote control for an interactive television system according to an embodiment of the invention.

FIG. 4 provides an expanded view of the remote control 204, including the microphone 208, the transmitter 210, and the microphone button 206. In addition, FIG. 4 illustrates an activity indicator 402, which illuminates or otherwise signals the user when the microphone 208 is active. The activity indicator 402 may be embodied as an LED (light-emitting diode) or other suitable indicator.

As illustrated, the remote control 204 may include a number of other buttons or controls, such as an "accept" button 406, a "reject" button 408, and a "switch" button 410, the functions of which are described below. Those skilled in the art will recognize that the various components of the remote control 204 may be positioned in different locations for ergonomics and ease-of-use.

Figure 5:
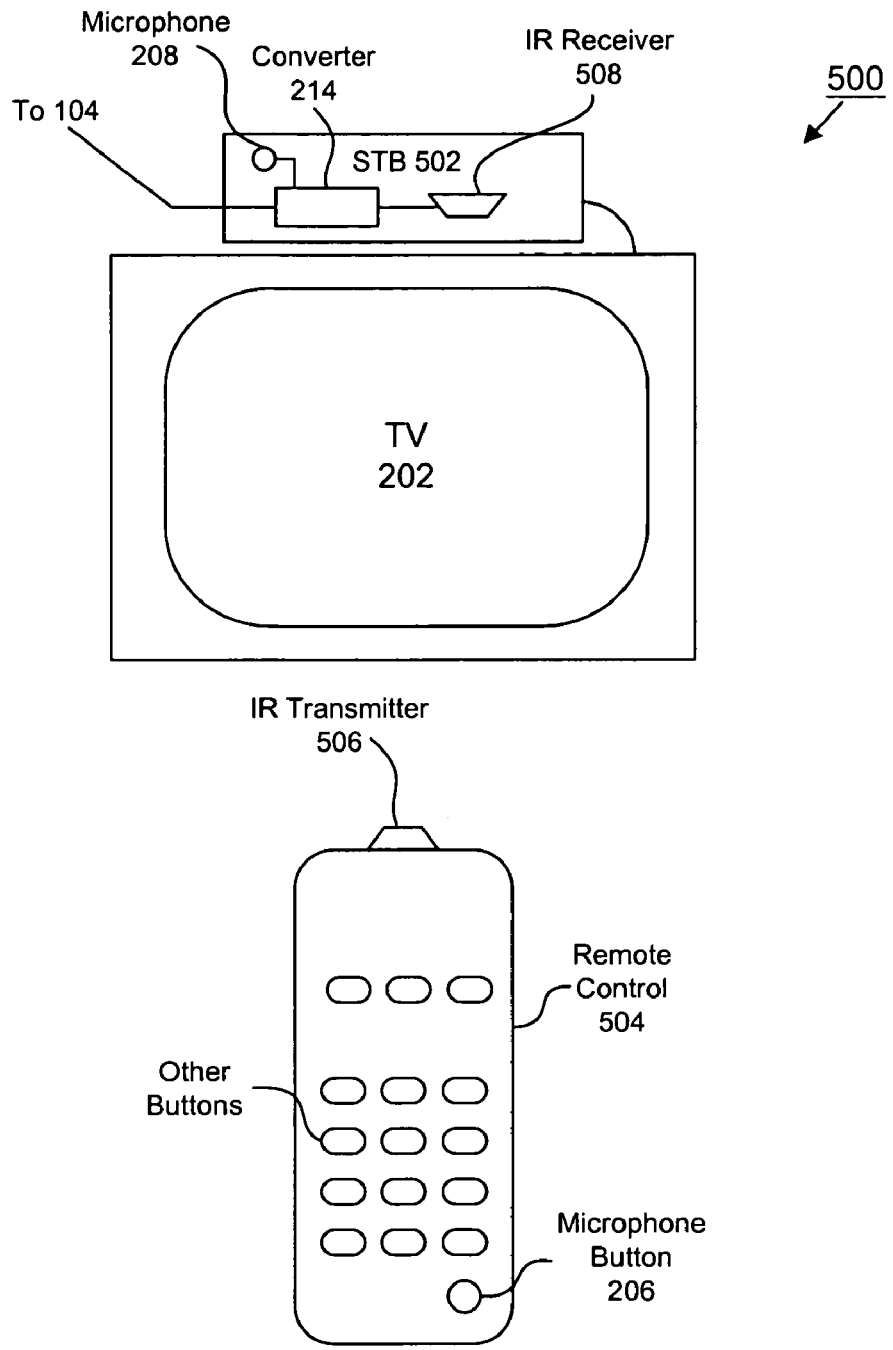
FIG. 5 is a schematic block diagram of an interactive television system according to an embodiment of the invention.

Referring now to FIG. 5, there is shown an alternative interactive television system 500 according to an embodiment of the invention. The television system 500 differs primarily from the television system 200 of FIG. 2 in that the microphone 208 is disposed within a STB 502 rather than a remote control 504.

In the illustrated embodiment, the remote control 504 includes an infrared (IR) transmitter 506 for sending control signals to an IR receiver 508 within the STB 502 and/or the television 202. In alternative embodiments, however, the transmitter may use RF, VHF, UHF, microwave, or other frequencies. In one embodiment, the remote control 504 also includes a microphone button 206 for enabling remote operation of the microphone 208 disposed within the STB 502.

Figure 6:
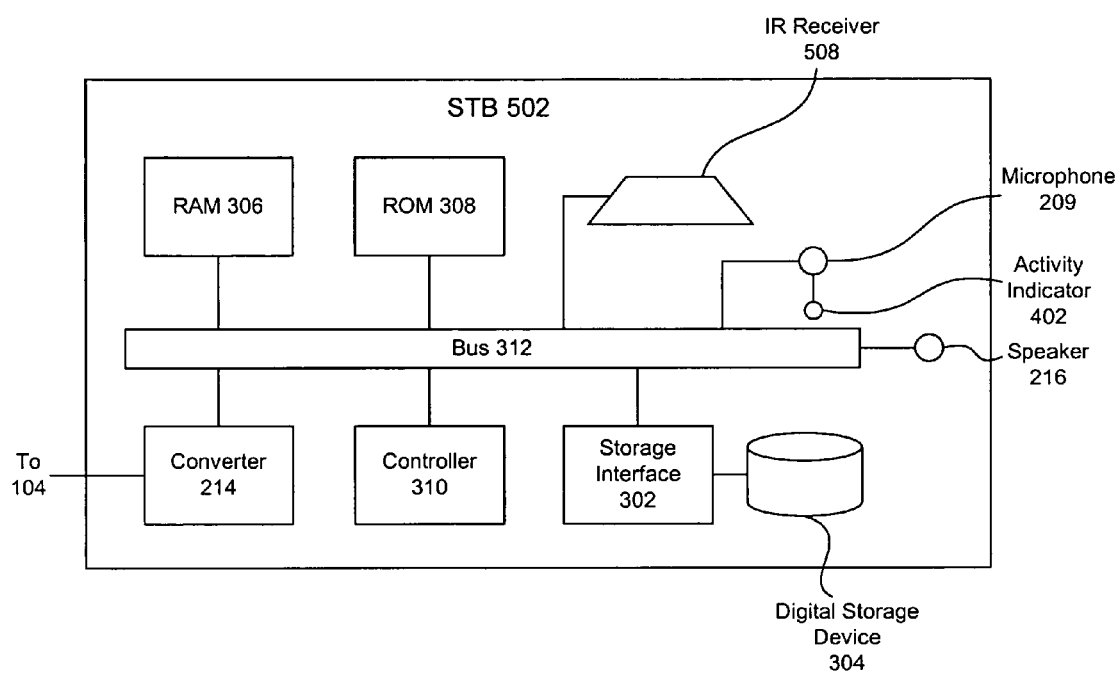
FIG. 6 is a schematic block diagram of a set top box according to an embodiment of the invention.

Referring to FIG. 6, there is shown an expanded block diagram of the STB 502. The converter 214, the speaker 216, the storage interface 302, the digital storage device 304, the RAM 306, the ROM 308, and the controller 310 function as previously described with reference to FIG. 3. However, the STB 502 includes a microphone 208, which is depicted as being in communication with the bus 312. In addition, the STB 502 is depicted as including an activity indicator 402 for visually indicating to a user when the microphone 208 is active.

Figure 7:
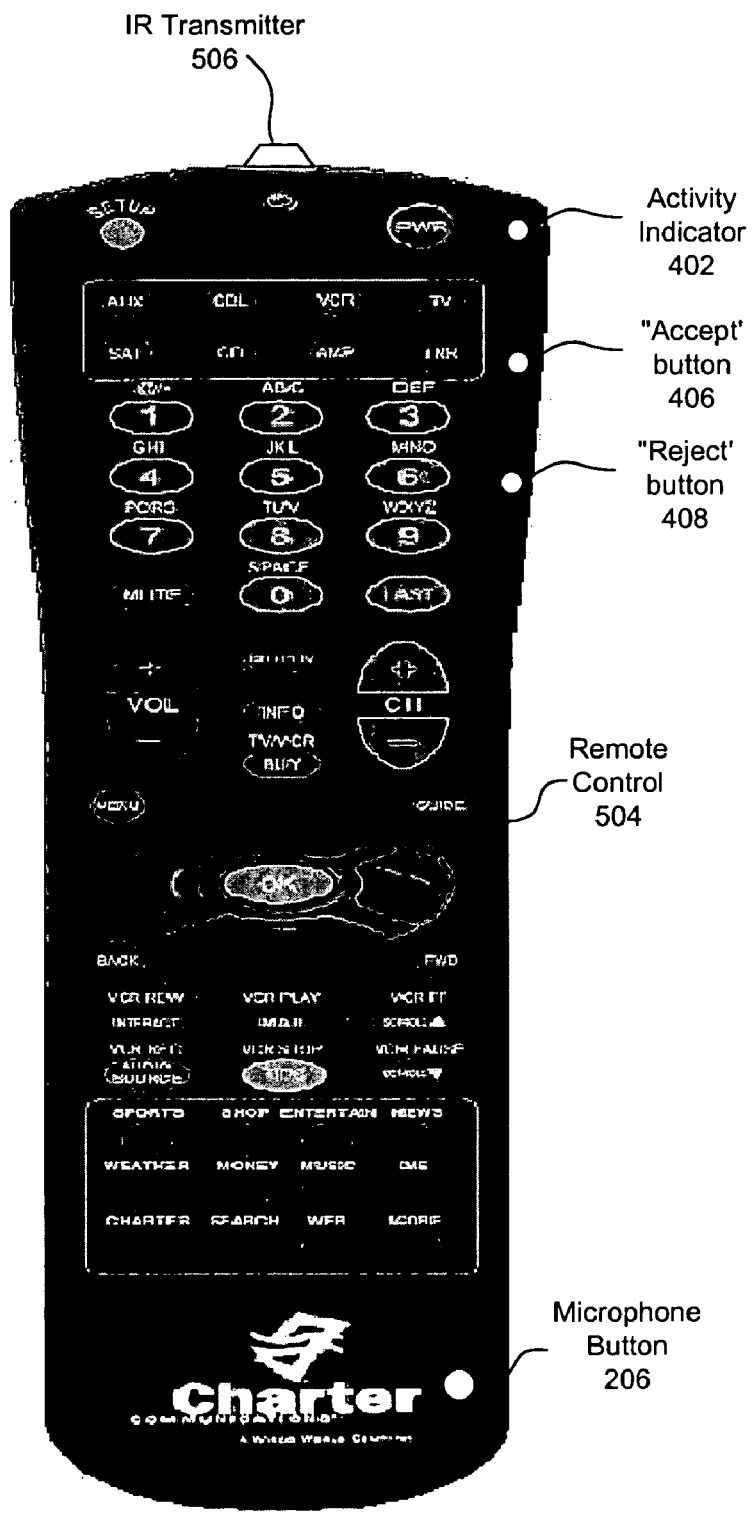
FIG. 7 is a plan view of a remote control for an interactive television system according to an embodiment of the invention.

FIG. 7 provides an expanded view of the remote control 504, including the IR transmitter 506, the microphone button 206, the "accept" button 406 and the "reject" button 408. The remote control 504 may also include a separate activity indicator 402 in addition to the indicator 504 in the STB 502. Those skilled in the art will recognize that the various components of the remote control 504 may be positioned in different locations for convenience and ergonomics.

In yet another alternative embodiment, the remote control 504 and the STB 502 may both be configured with a microphone 208. This would allow a user to select between a microphone 208 disposed locally on the remote control 504 and a microphone 208 disposed remotely on the STB 102. Thus, a user may conveniently switch between a microphone 208 at a fixed location and a remote-mounted microphone 208 that is highly mobile. In one embodiment, the "switch" button 410 of FIG. 4 may be used for this purpose.

Figure 8:
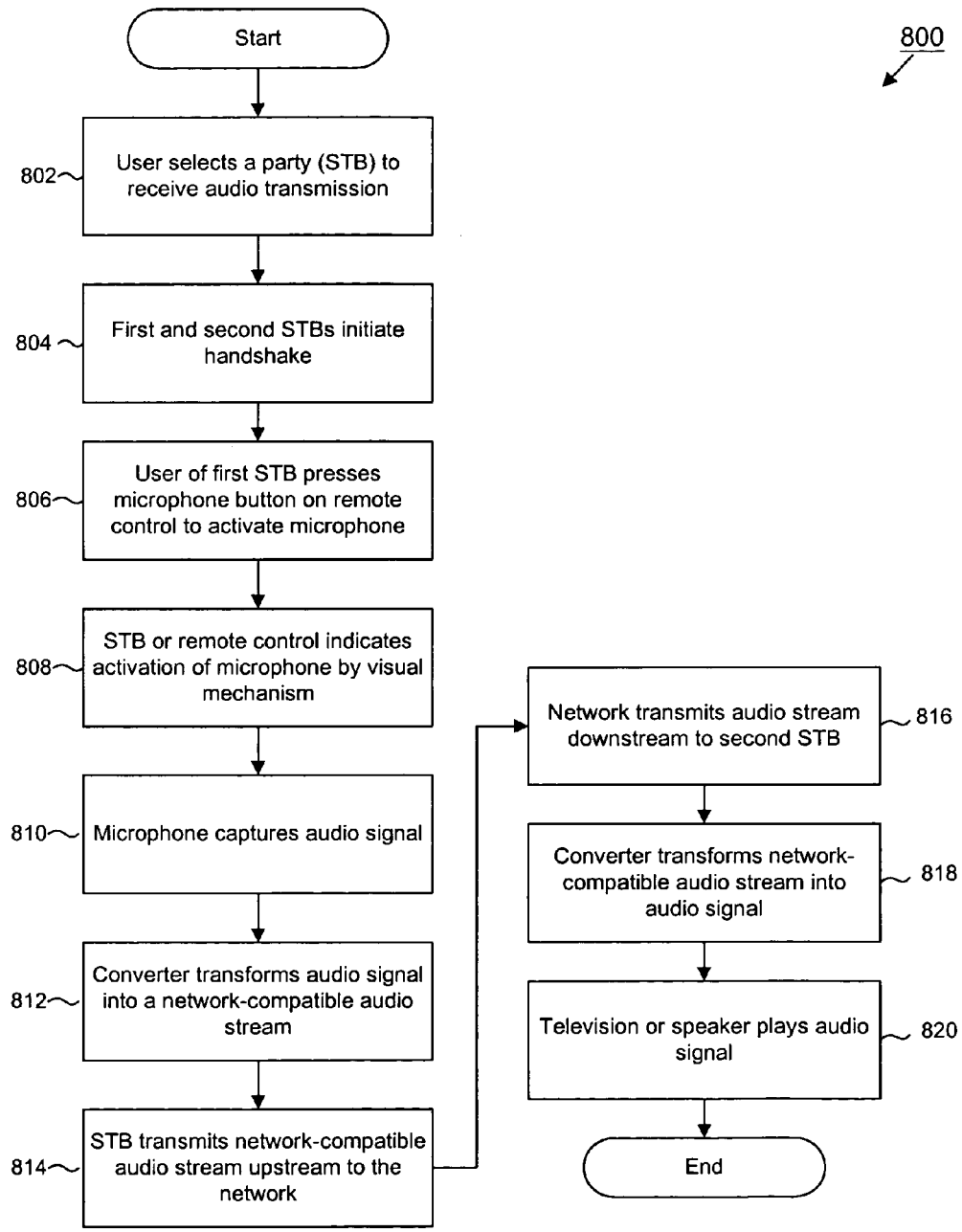
FIG. 8 is a flowchart of a method for audio capture and communication according to an embodiment of the invention.

FIG. 8 is a flowchart of a method 800 for audio capture and communication according to an embodiment of the invention. The method 800 begins when a user of a first STB 102 selects 802 a second STB 102 (or set of STBs 102) in the network 100 to receive an audio transmission. The selection may be performed by entering an identification of the second STB 102 or a user thereof by means the remote control 204. If a user's name is specified, for example, the first STB 102 may access a name server or directory (not shown) to retrieve a corresponding address of the second STB 102. In one embodiment, the first STB 102 may contain a local directory of addresses to which the user frequently sends audio transmissions.

Once the first STB 102 has a valid address, it sends a request across the network 100 to the second STB 102. The precise format of the request is not crucial to the invention, but the request should indicate to the second STB 102 that the user of the first STB 102 desires to send an audio transmission.

In response to the request, the second STB 102 generates a notification, such as a text message or icon, for display on the corresponding television 202 to notify the user of the second STB 102 of the audio transmission. Alternatively, the notification may take the form of an audio signal that is played on a speaker 216 in the second STB 102 or in the television 202.

If the second STB 102 is off-line or otherwise not available, the first STB 102 may wait until a timeout period has expired, after which it notifies the user that the audio transmission cannot be sent. Likewise, if the user of the second STB 102 does not respond, or refuses to receive the transmission (by means of the "reject" button 408 of FIG. 4, for example) a not-available signal may be returned to the first STB 102.

If the user of the second STB 102 wishes to receive the audio transmission, she may press a suitable button the remote control 204, such as the "accept" button 406 of FIG. 4, which results in an acceptance signal being returned to the first STB 102. In one embodiment, the first STB 102 generates, in response to receiving the acceptance signal, a video or audio acceptance message to notify the user that permission for the audio transmission has been granted.

The first and second STBs 102 may then initiate 804 a handshake procedure to establish a communication protocol. Such a handshake procedure may have some similarity with handshake procedures performed between facsimile (fax) machines. In this case, the STBs 102 may negotiate a new protocol or reaffirm an existing protocol for audio communication. The appropriate protocol may need to be determined because the two STBs have different audio conferencing capabilities. For example, the second STB may be capable of audio conferencing at a lower sound quality, so the communication protocol would be established as is suitable to this lower quality. The communication protocol used may also depend on the bandwidth and/or reliability of the connection between the two set top boxes. At this point, an active communication link is established between the STBs 102 across the network 100.

In one embodiment, the first user then activates 806 the microphone 208 by pressing, for example, the microphone button 206. In one implementation, the remote control 204 and/or STB 102 indicates 808 activation of the microphone 208 by a visual mechanism, such as an activity indicator 402 (e.g., LED). Thereafter, the microphone 208 captures 810 an audio signal, which is transmitted to the STB 102 in the case of the remote control 204 of FIG. 2.

The converter 214 within the STB 102 then transforms 812 the captured audio signal into a network-compatible audio stream for transmission over the network 100. Thereafter, the network-compatible audio stream is transmitted 814 upstream to the network 100. As noted with reference to FIG. 1, the communication path for the transmission may involve one or more headends 104, network centers 106, and/or the Internet 108, using conventional routing techniques.

In one embodiment, the network-compatible audio stream is then transmitted 816 downstream from the network 100 to the second STB 102. Thereafter, the network-compatible audio stream is transformed 818 into audio signal for playback 820 on the television 202 or the speaker 216 integrated with the STB 102.

In a like manner, the second STB 102 may transmit audio information to the first STB 102. Indeed, in one embodiment, multiple audio streams may be received and transmitted simultaneously by a STB 102. Multiple audio streams received by an STB 102 may be mixed for playback on the television 202 or the speaker 216 using conventional techniques. Thus, audio conferencing between two or more users of networked interactive television systems 200 is enabled.

Of course, the above-described method 800 is only one possible technique for audio capture and communication within the scope of the invention. In alternative embodiments, the first STB 102 may transmit an audio stream to the second STB 102 without waiting for an acceptance signal. The second STB 102 may record all incoming transmissions in the digital storage device 304. Thereafter, a user of the second STB 102 may review the stored audio streams and select which stream, if any, to play at a convenient time.

In yet another alternative embodiment, the first STB 102 may be pre-configured to transmit audio information to a second STB 102, which has previously granted permission to receive the transmission. Accordingly, a user of the first STB 102 may simply press the microphone button 206 to immediately capture audio information and transmit the same to the second STB 102 for immediate playback.

Alternatively, the audio conferencing may occur between the first STB 102 and a client terminal more generically (not just a second STB 102). The client terminal may comprise a phone, personal computer or other device with a connection to the Internet 108, or to a network center 106, or to a headend 104. Such other devices may include telephones, cell phones, Internet appliances, Internet-enabled personal digital assistants, and the like. For example, phones may be connected to the public switched phone system which in turn may be connected to the Internet 108, or to a network center 106, or to a headend 104. These devices are likely to have varying audio conferencing capabilities, so a handshaking procedure as described above is likely to be quite useful in determining a proper communication protocol.

In view of the forgoing, the present invention offers numerous advantages not available in the prior art. By integrating a microphone 208 within a remote control 204 for an interactive television system 200, a user may easily converse during a television broadcast with one or more other users at remote physical locations with minimal disruption of the television program and in a cost-effective manner.

The above description of illustrated embodiments of the invention is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined by the following claims, which are to be construed in accordance with established doctrines of claim interpretation.

What is claimed is:

1. A method for audio capture and communication comprising:
    generating an audio signal using a microphone integrated with a remote control for an interactive television system;
    transmitting the audio signal using a wireless transmitter integrated with the remote control;
    receiving the audio signal at a wireless receiver integrated with a first set top box for the interactive television system;
    recording the audio signal in a digital format within the first set top box;
    transmitting the recorded audio signal from the first set top box over a network to a second set top box; and
    storing the audio signal within the second set top box device with other stored audio signals for later selective playback by a user.

2. The method of claim 1, wherein the audio signal is generated in response to activation of a specifically-designated button on the remote control.

3. The method of claim 1, further comprising:
    displaying a visual indication on the remote control when the microphone is active.

4. The method of claim 1, wherein transmitting further comprises:
    transforming the audio signal into a format compatible for transmission over the network.

5. The method of claim 4, wherein recording further comprises:
    recording the audio signal in a hard disk drive integrated with the set top box.

6. The method of claim 1, wherein the digital format comprises an MP3 format.

7. The method of claim 1, further comprising:
    receiving from the remote control an indication of the second set top box to receive the audio signal.

8. The method of claim 1, wherein storing the audio signal within the receiving device further comprises:
    recording the audio signal received from the network in a hard disk drive integrated with the receiving device.

9. The method of claim 1, further comprising:
    playing back a selected one of the stored audio signals within the receiving device in response to a user command.

10. The method of claim 9, wherein playing back further comprises:
    playing back the audio signal on a television coupled to the receiving device.

11. The method of claim 9, wherein playing back further comprises:
playing back the audio signal on an internal speaker of the receiving device.

12. A method for audio capture and communication comprising:
in response to activation of a specifically-designated button on a remote control, generating an audio signal using an internal microphone integrated within a set top box for an interactive television system;
transforming the audio signal into an audio stream of a format compatible for transmission over a network;
transmitting the audio stream from the set top box to the network; and
switching from generating an audio signal using the internal microphone within the set top box to generating an audio signal using a remote microphone integrated within the remote control in response to a user command, wherein the user command is transmitted in response to activation of a specification-designated button on the remote control.

13. The method of claim 12, further comprising:
displaying a visual indication on the remote control when the microphone within the set top box is active.

14. The method of claim 12, further comprising:
recording the audio stream in a hard disk drive integrated with the set top box.

15. The method of claim 12, further comprising:
transmitting the audio stream from the network to a second set top box.

16. The method of claim 15, further comprising:
receiving from the remote control an indication of the second set top box to receive the audio stream.

17. The method of claim 15, further comprising:
recording the audio stream received from the network in a digital storage device integrated with the second set top box.

18. The method of claim 15, further comprising:
transforming the audio stream received from the network into an audio signal.

19. The method of claim 18, further comprising:
playing the audio signal on a television coupled to the second set top box.

20. The method of claim 18, further comprising:
playing the audio signal on a speaker coupled to the second set top box.

21. The method of claim 12, further comprising:
displaying a visual indication on the set top box when the internal microphone is active.

22. The method of claim 12, wherein the format of the audio stream comprises an MP3 format.

23. The method of claim 12, further comprising:
switching from generating an audio signal using an internal microphone within the set top box to generating an audio signal using a remote microphone integrated with a remote control device in response to a user command.

24. The method of claim 23, wherein the user command is transmitted in response to activation of a specifically-designated button on the remote control device.

* * * * *